(12) United States Patent
Hrabik et al.

(10) Patent No.: US 7,168,093 B2
(45) Date of Patent: Jan. 23, 2007

(54) METHOD AND APPARATUS FOR VERIFYING THE INTEGRITY AND SECURITY OF COMPUTER NETWORKS AND IMPLEMENTATION OF COUNTER MEASURES

(75) Inventors: Michael Hrabik, Omaha, NE (US); Jeffrey J. Guilfoyle, Omaha, NE (US); Edward Mac Beaver, Omaha, NE (US)

(73) Assignee: Solutionary, Inc., Omaha, NE (US)

( * ) Notice: Subject to any disclaimer, the term of this patent is extended or adjusted under 35 U.S.C. 154(b) by 0 days.

(21) Appl. No.: 09/770,525

(22) Filed: Jan. 25, 2001

(65) Prior Publication Data

US 2002/0099958 A1    Jul. 25, 2002

(51) Int. Cl.
*G06F 11/30* (2006.01)
*G06F 15/16* (2006.01)

(52) U.S. Cl. ............ 726/22; 726/2; 726/3; 726/6; 726/15; 726/23; 726/24; 726/25; 709/208; 709/209; 709/223; 709/224; 709/225; 709/226; 709/227; 709/228; 709/229

(58) Field of Classification Search ........ 713/200–201; 709/208–209, 223–229; 714/14, 15; 726/22, 726/23, 24, 25
See application file for complete search history.

(56) References Cited

U.S. PATENT DOCUMENTS

| | | | | |
|---|---|---|---|---|
| 5,796,942 A | * | 8/1998 | Esbensen | ............... 709/229 |
| 5,909,493 A | * | 6/1999 | Motoyama | ............... 713/154 |
| 5,961,644 A | * | 10/1999 | Kurtzberg et al. | ........ 713/200 |
| 6,088,804 A | * | 7/2000 | Hill et al. | ............... 713/200 |
| 6,185,689 B1 | | 2/2001 | Todd, Sr. et al. | |
| 6,205,551 B1 | | 3/2001 | Grosse | |
| 6,205,552 B1 | | 3/2001 | Fudge | |
| 6,226,372 B1 | | 5/2001 | Beebe et al. | |
| 6,269,447 B1 | | 7/2001 | Maloney et al. | |
| 6,282,546 B1 | | 8/2001 | Gleichauf et al. | |
| 6,301,668 B1 | | 10/2001 | Gleichauf et al. | |
| 6,304,973 B1 | * | 10/2001 | Williams | ................. 713/153 |
| 6,324,656 B1 | | 11/2001 | Gleichauf et al. | |
| 6,343,362 B1 | | 1/2002 | Ptacek et al. | |
| 6,738,911 B1 | | 5/2004 | Hayes | |

OTHER PUBLICATIONS

Messmer, Cultivating Managed Security Outsourced Security Can Ease Admin., Jun. 10, 2002, Network World, p. 19.*
Shipley, Enterprise-Class ISPs, 1998, Network Computing, p. 116.*
Turner, E-Commerce Sites Under Heavy Attack From Hackers, Dec. 8, 1997, vol. 11, issue 24.*

(Continued)

*Primary Examiner*—Christopher Revak
*Assistant Examiner*—Jenise E. Jackson
(74) *Attorney, Agent, or Firm*—Anna Vishev, Esq.; Wolff & Samson PC

(57) ABSTRACT

A method and apparatus for verifying the integrity of devices on a target network having two components: a subsystem connected to the target network, and a master system, isolated therefrom by a secure link. The topological and hierarchical relationship of the of the devices to each other improves stability of the apparatus. Random testing of target network devices by the subsystem and random testing of the subsystem by the master system provide verification and independent self-checking.

16 Claims, 2 Drawing Sheets

OTHER PUBLICATIONS

Rutrell, Managed Security Gets Sophisticated, 2001, Internet Week, p. 23.*

Emigh, IBM Wheelgroup Partner to Thwart Net Hackers, Jul. 28, 1997, Newsbytes, p. 1-2.*

Violino, Collapsing the Fortress Walls, 1997, Information Week, n. 635, p. 104.*

Newton, Netwon's Telecom Dictionary, Mar. 1998, Flatiron Publishing, p. 636.*

Higgins, Call in the Guards, Communications Week, 1997, p. 48.*

Messmer, Cultivating Managed Security Outsourced Security Can Ease Admin., Jun. 10, 2002, Network World, p. 19.*

Shipley, Enterprise-Class ISPs, 1998, Network Computing, p. 116.*

Yasin, Managed Security Gets Sophisticated, 2001, Internet Week, p. 1-2.*

Messmer, Security Needs Spawn Services, Apr. 3, 2000, Network World.*

Electronic Commerce News, Phillips Business Information, Nov. 24, 1997, vol. 2, p. 1-2.*

Giles, Internet Security, Mar. 1997, vol. 5, p. 22.*

IBM Making E-Commerce Safer, More Reliable, Pc Week, Dec. 1, 1997, vol. 14, n50, p. 34.*

Claderbank, 1996, Internet Security to Ship Realsecure, n714.*

Livermore, Dec. 1996, National Info-Sec Technical Baseline, p. 1-23.*

Carver, May 2000, p. 1-2.*

AccessGuard, 2003, http://www.accessguard.nl/.*

Shnackenberg, Jun. 2000, Infrastructure for Intrusion Detection and Response.*

NetRanger User's Guide, version 2.1.1, Copyright © 1998 Cisco Systems, Inc., downloaded from web site: http://www.broadbandbuilders.com/application/pdf/en/us/guest/products/ps6038/c1676/ccmigration_09186a00800ee98e.pdf, printout date: Jun. 22, 2005, 334 pages.

* cited by examiner

METHOD AND APPARATUS FOR VERIFYING THE INTEGRITY AND SECURITY OF COMPUTER NETWORKS AND IMPLEMENTATION OF COUNTER MEASURES

FIELD OF THE INVENTION

This invention relates to a method and apparatus for verifying the integrity of a computer security subsystem for preventing attacks on computer network security systems.

BACKGROUND OF THE INVENTION

Concurrent with the rise in connectivity among diverse computer networks and the corresponding increase in dependence on networked information systems, there has been a dramatic increase in the need for robust security to enforce restrictions on access to and prevent intrusion on secure systems. The topology of the interconnected networks has also grown increasingly complex, and often involves open networks such as the internet that expose secure systems to increased threats of attack. Consequently, no single solution has yet been proposed that addresses all current needs for intrusion detection and response. Instead, a vast assortment of security devices and techniques has evolved and has generally been implemented differently on individual systems. This has resulted in a global security patchwork, inherently susceptible to attack and to individual systems which themselves implement a hodge podge of different security devices and techniques.

Attempts to gain unauthorized access to computer networks capitalize on inherent loopholes in a network's security topology. It is known, for example, that although a secure system connected to the internet may include firewalls and intrusion detection systems to prevent unauthorized access, weaknesses in individual security components are often sought out and successfully exploited. The rapid introduction of new technology exacerbates the problem, creating or exposing additional weaknesses that may not become known until a breach in security has already occurred.

A fundamental weakness shared in common by current intrusion detection and response systems is their "flat" or non-hierarchical implementation. The configuration shown in FIG. 1 is an example of such a typical network implementation on a hypothetical "target network". The network 10 includes a plurality of file servers 14, workstations 16, a network intrusion detection system (IDS) 18, a remote access server 20 and a web server 22. These devices are connected to each other over network backbone 12, and form a local or wide-area network (LAN or WAN). Router 26 is connected directly to an open network such as the internet, 30, and is connected to the devices on network backbone 12 through network firewall 24.

The firewall 24 and the IDS 18 are part of the security system of network 10. Firewall 24 is configurable and serves to control access by hosts on the internet to resources on the network. This protects network 10 from intruders outside the firewall, essentially by filtering them out. IDS 18 scans packets of information transmitted over backbone 12 and is configured to detect specific kinds of transactions that indicate that an intruder is attempting, or already has gained access to the network, 10. In this way, the IDS protects the network from intruders inside as well as outside the firewall. Other devices on network 10 may also contribute to network security, such as remote access server 20 which permits access directly to network 10 from remote computers (not shown), for example over a modem. Remote access server 20 must also implement some security function such as username and password verification to prevent intruders from gaining access to the network and bypassing firewall 24.

In a typical intrusion scenario on a target network connected to the internet, an intruder will first learn as much as possible about the target network from available public information. At this stage, the intruder may do a "whois" lookup, or research DNS tables or public web sites associated with the target. Then, the intruder will engage in a variety of common techniques to scan for information. The intruder may do a "ping" sweep in order to see which machines on the target network are running, or they may employ various scanning utilities well known in the art such as "rcpinfo", "showmount" or "snmpwalk" to uncover more detailed information about the target network's topology. At this stage the intruder has done no harm to the system, but a correctly configured network IDS should be able, depending on its vantage point on the network, to detect and report surveillance techniques of intruders that follow known patterns of suspicious activity. These static definitions, known as "intrusion signatures", are effective only when the intruder takes an action or series of actions that closely follow the established definitions of suspicious activity. Consequently, if the IDS is not updated, is disabled or encounters an unknown or new method of attack, it will not respond properly. However, if steps are not taken at this point in the attack to prevent further penetration into the target network, the intruder may actually begin to invade the network, exploiting any security weaknesses (such as the IDS that may not have reacted earlier to the intruder), and securing a foothold on the network. Once entrenched, the intruder may be able to modify or disable any device belonging to the target network including any remaining IDS or firewall.

Methods used by intruders to gain unauthorized access to computer networks evolve in sophistication in lock step with advances in security technology. It is a typical, however that successful attacks on network systems often begin by attacking the security subsystems in place on the target network that are responsible for detecting common intrusion signatures, disabling those systems and destroying evidence of the intrusion.

U.S. Pat. No. 5,916,644 to Kurtzberg et al. discloses a method for testing the integrity of security subsystems wherein a specially configured system connected to directly a target computer network will systematically test security on the network by simulating attacks on security devices in order to verify that they are operational. Specifically, the disclosed method randomly simulates an attack on the network. If the attack is detected, the security subsystems are assumed to be functioning. If not, they are considered compromised, and an attack may already be underway. This method is an improvement over passive systems that do not check themselves and therefore cannot properly report on their own status when they have been disabled.

A major shortcoming of this approach is that these security systems reside on the same networks that they seek to protect and are similarly vulnerable to attack once an intruder has gotten a foothold on the network. In other words, they are not themselves immune to the attacks of intruders. As a result each advance in the prior art is just another new security hurdle on the network to be defeated. In this light, the active scanning approach disclosed in Kurtzberg is not fundamentally different from any other security measure (such as a firewall) in that it is non-hierarchical and depends completely on the vigilance of a human network manager.

Therefore, there exists a need for a self-diagnosing network security system that can protect a target network from both internal and external intruders and that is resistant to attacks perpetrated on the system it has been deployed to protect. Furthermore, there is a need for an active security system that will take measured action against perceived security threats even in the absence of a human network manager.

SUMMARY OF THE INVENTION

It is therefore an object of the present invention to provide a network security system for a network of computers that is capable of solving the above mentioned problems in the prior art.

It is another object of the present invention to provide a network security system that has a component that can directly monitor multiple network security devices on a network for attack signatures and other suspicious network activity suggesting an attempt to compromise security on that network.

It is another object of the present invention to provide a network security system that can dynamically detect new patterns or trends in network activity that suggest an attempt to compromise network security on a single network or on a plurality of otherwise unrelated networks.

It is another object of the present invention to provide a network security system that can resist intrusion during an attack on the network.

It is another object of the present invention to provide a security system providing integrity verification for security devices on a network, and can also reliably verify its own integrity.

It is another object of the present invention to provide a security system for a computer network that can take corrective measures after an attack has been detected to prevent an intruder from gaining further access to the network.

It is another object of the present invention to provide a security system satisfying the above objectives for individual computers connected to an open network.

According to an example of the present invention, there is provided a network security system to prevent intrusion on a target network having at least one security subsystem local to the target network provided to monitor network traffic and to detect attacks by an intruder on the system. The subsystem is connected via a secure link to a master system that is not otherwise connected to the target system. The master system monitors the subsystem via the secure link and registers information pertaining to the status of the subsystem. If the subsystem detects an attack on the target network, or does not respond to the master system, the master system will take appropriate action, ranging from logging the incident or notifying a network manager to attempting to shut down the network. Accordingly, even attacks that completely disable the subsystem will not prevent the master system from responding as long as the link remains secure.

According to another example of the present invention, a multi-level hierarchy is implemented making the subsystem subordinate to the master system. In this configuration, commands can only be passed from the master system to the subsystem, ensuring that the integrity of the master system can not be undermined, even by successful attacks on the target network, or on the subsystem itself. Therefore, even a subversion of the subsystem and a compromised link between it and the master system is insufficient to disable the master system.

According to another example of the present invention, a pseudo-attack generator associated with the master system is provided that simulates attacks on the target network that should be detected by the subsystem. By comparing the pseudo-attacks made on the target network to the attacks actually detected by the subsystem, the master system can determine whether the integrity of the subsystem has been compromised. Similarly, the subsystem may generate its own pseudo-attacks on other network security components to establish their integrity as well. Therefore it is possible to test comprehensively every security-related device connected to the target network.

In another example of the present invention, the subsystem, and the master system acting through the subsystem, can implement corrective measures to mitigate or thwart suspected intruder attacks on the target network.

DESCRIPTION OF THE PREFERRED EMBODIMENTS

The preferred embodiments of a network security system according to the present invention will hereinafter be described with reference to the accompanying drawings.

Figure 1:
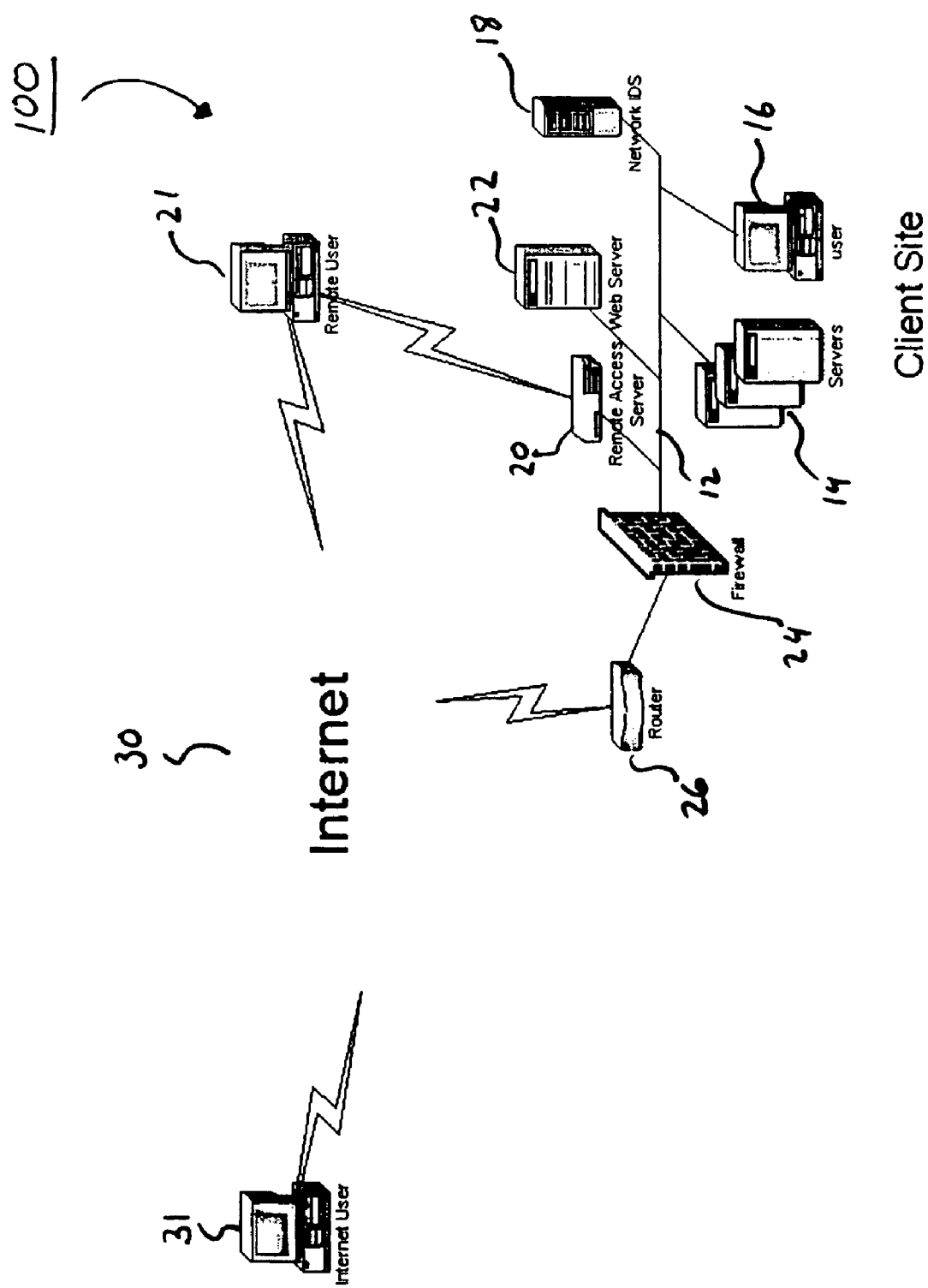
FIG. 1 is a block diagram showing the overall structure of an example of a network system according to the prior art.
Figure 2:
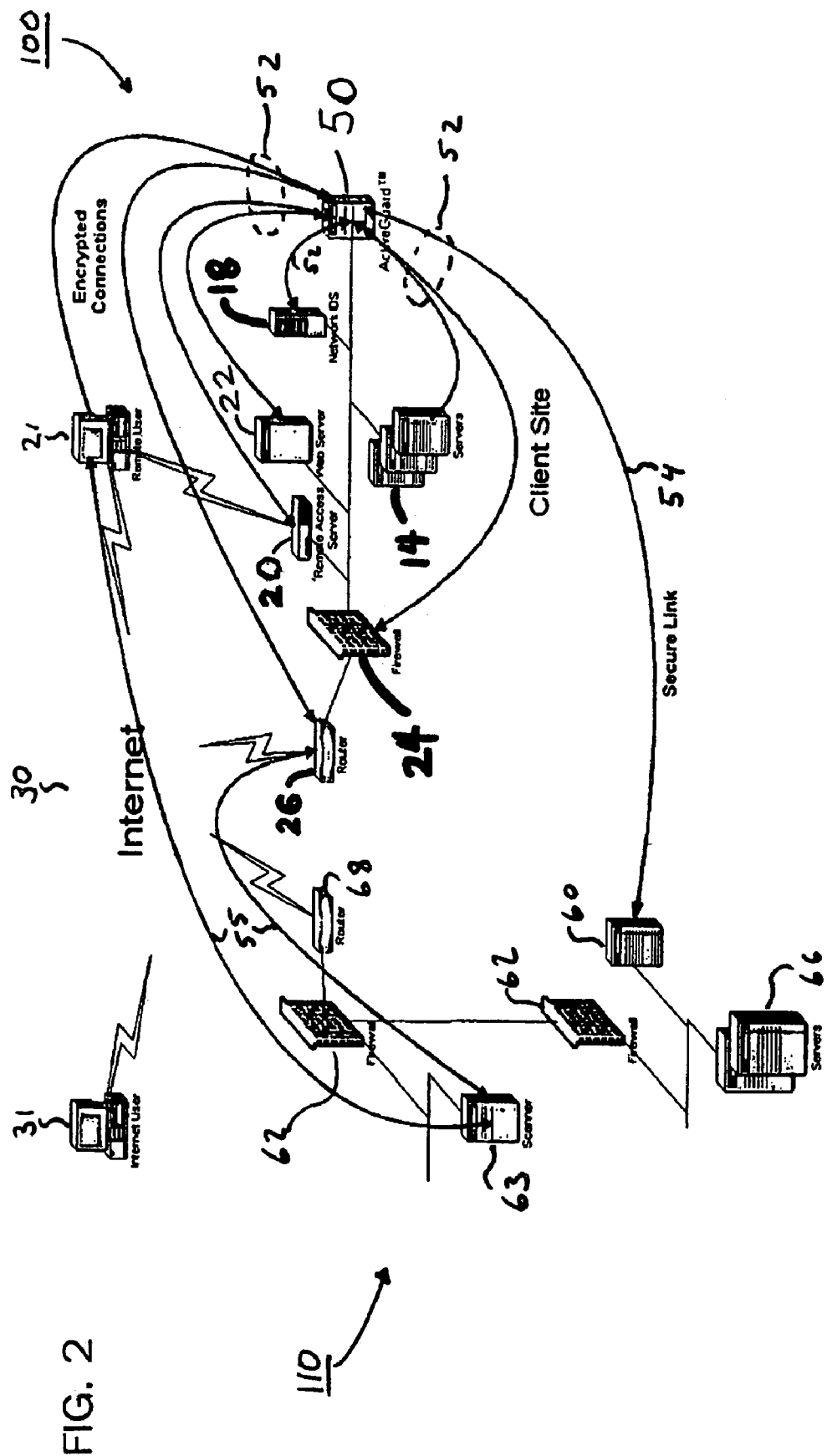
FIG. 2 is a block diagram showing an example of a network incorporating the system of the present invention.

Referring to FIG. 2, a first embodiment of the present invention is shown. Target network 100 is shown having the same basic components as the network of the prior art shown in FIG. 1 with the addition of security subsystem 50, however it should be noted that the actual configuration of the target network is not critical with the exception of at least one security subsystem 50. Each of the security subsystem 50, servers 14, workstations 16, IDS 18, remote access server 20, web server 22, firewall 24 and router 26 are connected together over network backbone 12. Each of the devices carry out communication over the backbone in accordance with a predetermined communication protocol such as Transmission Control Protocol/Internet Protocol (TCP/IP).

Target network 100 is connected through firewall 24 and router 26 to the internet 30 as well as through remote access server 20 which may also be selectively connected to the internet 30 through remote user 21. These two potential points of contact with an open network, in this case the internet, exposes target network 100 to the threat of intrusion from any host with access to the internet such as internet user 31. In addition to threats from the outside, those with direct access to the resources of target network 100, such as those using one of the workstations 16, also pose an intrusion threat. If an intruder were to gain access to one of the critical security-related devices such as the IDS 18 or the firewall 24 or any trusted computer from within or outside the target network 100, security on the network could be compromised.

In the present invention, security subsystem 50 is connected to network backbone 12 and linked to each of the network's devices by a secure link 52. Such a secure link may be established through an encrypted communication protocol such as Secure Sockets Layer (SSL). This ensures that communication between the security subsystem 50 and the other components of the target network cannot be intercepted by an intruder. A similar secure link 54 is established as a virtual private network (VPN) tunnel between the security subsystem 50 and a master system 60 connected to a remote network 110. Although the remote network is shown having its own firewalls 62, servers 66, and router 68, the ultimate configuration of remote network 110 is not critical beyond secure link 54 connecting security subsystem 50 and master system 60. However, secure links 55 may be established between a device such as a network scanner 63 and a router 26 or remote user 21 on network 100. Secure link 54 ensures that communication between the two networks cannot be intercepted by an intruder. Therefore, there should be no other direct connection between target network 100 and remote network 110 except over a secure link.

Preferably, the security system defined herein is embedded as a software package and implemented on computers comprising at least a master system and the security subsystem.

During operation, security subsystem 50 monitors the activities of the devices of the target network 100. Particularly, the critical security-related functions of IDS 18 and firewall 24 are tested. The particular method employed by security subsystem 50 in testing these devices is not critical, however the above mentioned approach employing simulated attacks on the components would be suitable.

Upon testing the devices, if the integrity of a device on target network 100 cannot be verified, security subsystem 50 reacts. For example, if IDS 18 has been identified by the subsystem as not reacting properly to attacks on it originating from the internet, appropriate countermeasures could include cutting off or restricting access to the network at firewall 24 or stop at application level. If instead, the firewall is determined not to be functioning, appropriate action might include disabling access to any servers 14 holding sensitive data. In one possible configuration of the present invention, security subsystem 50 reports network device status to master system 60 which processes the information, and decides on further action. In an alternate configuration, security subsystem 50 is responsible for implementing countermeasures directly. In both cases, however, the results of every test are passed to master system 60 where they are stored for analysis.

The system of the present invention can also help thwart ongoing attacks and is uniquely suited to do so. In another preferred embodiment of the present invention, master system 60 hierarchically supercedes security subsystem 50. As such, the activities of security subsystem 50 are defined as a child process of master system 60 and are subordinate thereto. Although information preferably flows both ways between master system 60 and security subsystem 50 in this embodiment, the master system in this embodiment does not take direction from the subsystem.

As noted in the discussion of the prior art, non-hierarchical security systems are connected directly to a target network and are inherently susceptible to attacks on that network. This is in contrast to the present embodiment wherein, even if completely subverted during an attack on target system 100, security subsystem 50 would not result in a takeover of master system 60. The benefit of this configuration is that the master system would still be able to carry out its function. For example, if master system 60 is configured to sound an alarm when security subsystem 50 no longer responds to it, there would be no way, in this embodiment, for intruders on target network 100 to remotely shut down master system 60 because the master system will not respond to any instructions issued from a subordinate system. Although master system 60 may lose control of the target network, it is not in danger of being taken over by it. Additionally, if the link 54 between master system 60 and security subsystem 50 is severed or compromised, instructions may be routable instead through secure links 55.

In yet another embodiment of the present invention, remote network 110 is connected through router 70 to an open network such as the Internet. This enables master system 60 to send random pseudo-attacks to target network 100. The pseudo-attacks may mimic any of the actual attack signatures known by the master system to be detectable by the target network. If the expected reply is not received by the master system, an early indication of an intruder attack on the target network is indicated.

As set forth hereinabove, according to the present invention, it is possible to provide a method and apparatus for verifying the integrity of computers and computer networks that is independent of the network or computer being tested. In addition, by detecting early signs of intruder activity on a network, the present invention increases the likelihood that intruder attacks can be thwarted before they succeed.

When implemented on an individual computer, such as a single workstation 16 connected to an open network such as internet 30, the present invention functions similarly to prevent attacks on that computer originating from the open network. In the absence of network backbone 12 the functions of security subsystem 50 may be directly incorporated into an individual computer such as by software or peripheral hardware.

When implemented across a plurality of otherwise unrelated target networks, the present invention functions to prevent attacks according to the methods described herein on each target network individually. The advantage of this configuration is that security information may be coordinated across several networks without connecting the networks together.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and the scope of the claims.

We claim:

1. A security system for a computer network, the network having a plurality of devices connected thereto, at least some of the devices having security-related functions, the security system comprising:
    (a) a security subsystem associated with at least some of the devices in the network which tests the integrity of the security-related functions;
    (b) a master system which monitors the integrity of the security subsystem and receives and stores results of the integrity testing of the devices having security-related functions; and
    (c) a secure link connected between the security subsystem and the master system, the master system monitoring the integrity of the security subsystem and receiving the results of the integrity testing of the devices having security-related functions through the first secure link, wherein one of the master system and the security subsystem further monitors whether a device having security-related functions responds to said one of the master system and the security subsystem, and wherein one of the security subsystem and the master system takes action when no response is detected.

2. The system of claim 1 wherein the security subsystem tests the integrity of the security-related functions by generating pseudo-attacks on the devices having security-related functions.

3. The system of claim 1 wherein the countermeasures include restricting or disabling access to the network or a device in the network.

4. The system of claim 1 wherein the master system further comprises a pseudo-attack generator which generates attacks on the network, the security subsystem detecting such attacks when functioning properly, the master system comparing the pseudo-attacks made on the network to the attacks actually detected by the subsystem, the master system thereby determining whether the integrity of the subsystem has been compromised.

5. The system of claim 1 wherein the secure link is defined by a virtual private network (VPN) tunnel.

6. The system of claim 1 wherein at least one of the devices having security-related functions is a firewall.

7. The system of claim 1 wherein at least one of the devices having security-related functions is a network intrusion detection system.

8. A security system for a computer network, the network having a plurality of devices connected thereto, the security system comprising:
   (a) a security subsystem connected to at least some of the devices in the network, the security subsystem configured to monitor activities of the at least some devices on the network, and detect attacks on the at least some devices;
   (b) a master system which monitors the integrity of the security subsystem and registers information pertaining to attacks detected by the security subsystem; and
   (c) a first secure link connected between the security subsystem and the master system, the master system monitoring the integrity of the security subsystem and receiving the information pertaining to the attacks through the first secure link, wherein one of the master system and the security subsystem further monitors whether the device responds to one of the master system and the security subsystem, and wherein one of the security subsystem and the master system takes action when no response is detected.

9. A security system for a computer network, the network having a plurality of devices connected thereto, the security system comprising:
   (a) a security subsystem connected to at least some of the devices in the network, the security subsystem configured to monitor activities of the at least some devices on the network and detect attacks on the at least some devices;
   (b) a master system which monitors the integrity of the security subsystem and registers information pertaining to attacks detected by the security subsystem; and
   (c) a first secure link connected between the security subsystem and the master system, the master system monitoring the integrity of the security subsystem and receiving the information pertaining to the attacks through the first secure link, wherein the master system further monitors whether the security subsystem responds to the master system, the master system taking action if no response is detected.

10. The system of claim 9 wherein the master system does not take direction from the security subsystem.

11. The system of claim 9 further comprising:
    (d) a second secure link connected between the master system and the network which enables data communication from the master system to the network for issuing instructions to the network devices.

12. The system of claim 11 wherein the instructions are issued if the first secure link is severed or compromised.

13. The system of claim 9 wherein the master system is hierarchically independent from the security subsystem.

14. The system of claim 9 wherein the security subsystem is hierarchically subordinate to the master system.

15. The system of claim 9 wherein the first secure link is defined by a virtual private network (VPN) tunnel.

16. The system of claim 9 wherein the master system further comprises a pseudo-attack generator which generates attacks on the network, the security subsystem detecting such attack; and sending expected replies to the master system when its integrity is intact, the master system detecting whether the expected replies are received in response to a pseudo-attack to determine whether the integrity of the subsystem has been compromised.

* * * * *